No. 738,536. PATENTED SEPT. 8, 1903.
E. F. GWYNN.
GAS BURNER.
APPLICATION FILED AUG. 11, 1902.
NO MODEL.
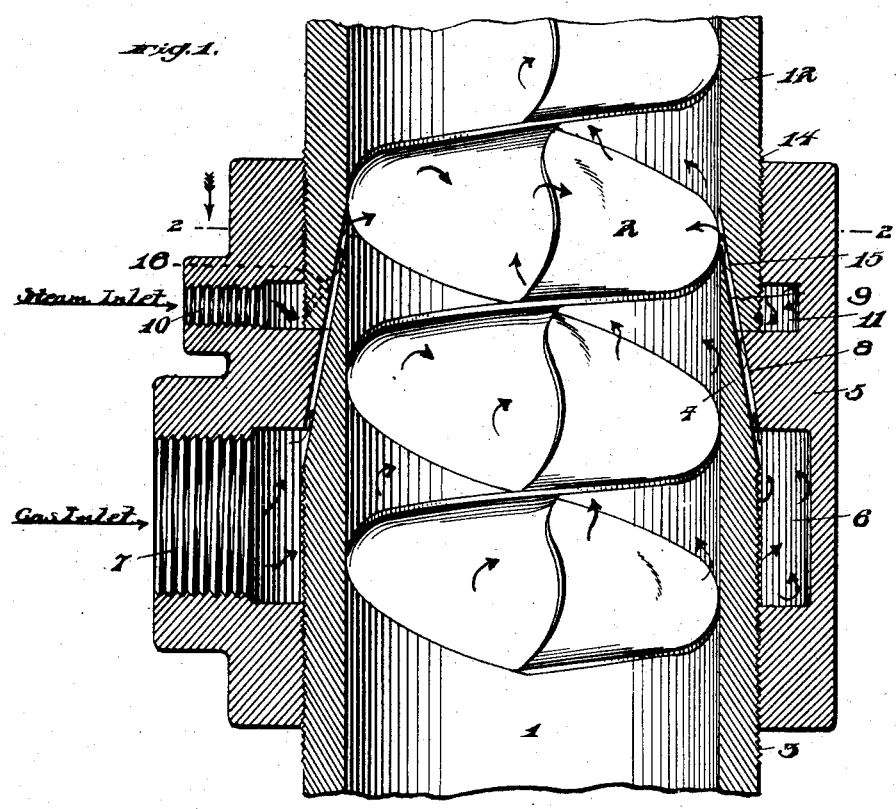
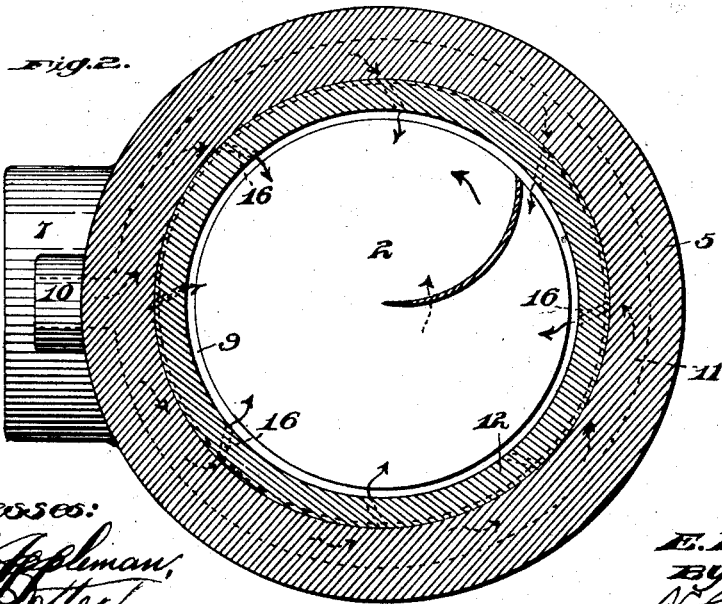

No. 738,536. Patented September 8, 1903.

UNITED STATES PATENT OFFICE.

EMMER F. GWYNN, OF PITTSBURG, PENNSYLVANIA.

GAS-BURNER.

SPECIFICATION forming part of Letters Patent No. 738,536, dated September 8, 1903.

Application filed August 11, 1902. Serial No. 119,226. (No model.)

*To all whom it may concern:*

Be it known that I, EMMER F. GWYNN, a citizen of the United States of America, residing at Pittsburg, in the county of Allegheny and State of Pennsylvania, have invented certain new and useful Improvements in Gas-Burners, of which the following is a specification, reference being had therein to the accompanying drawings.

This invention relates to certain new and useful improvements in gas-burners, and relates more particularly to that class of inventions employed for heating purposes.

The object of the present invention is to provide a gas-burner wherein the fuel may be economically used; furthermore, to provide novel means whereby the gas is mixed with both steam and air to increase the combustion.

A still further object of the invention is to provide novel means whereby the flame may be accurately regulated and provide a burner that will not clog and wherein the use of small jets, nipples, or the like is entirely dispensed with.

With the above and other objects in view the invention consists in the novel construction, combination, and arrangement of parts to be hereinafter more fully described, and specifically pointed out in the claims.

In describing the invention in detail reference is had to the accompanying drawings, forming a part of this specification, and wherein like numerals of reference indicate like parts throughout both views, in which—

Figure 1 is a vertical sectional view of my improved gas-burner. Fig. 2 is a longitudinal sectional view taken on the line 2 2 of Fig. 1 looking in the direction of the arrow.

In the drawings the reference-numeral 1 represents the central air-tube, having arranged therein a flat spiral 2, which frictionally engages the interior walls of the air-tube 1. Said air-tube is exteriorly screw-threaded, as shown at 3, and terminates into the cone-shaped extension 4. Surrounding the air-tube 1 is a casing 5, in which is formed a circular gas-chamber 6, which circumferentially extends and encircles a portion of the air-tube 1. This gas-chamber 6 communicates with the gas-inlet 7, and the inner walls of the casing 5 are likewise cone-shaped, as shown at 8, thereby forming the circular burner 9 between the cone-shaped walls of the tube 1 and casing 5. The steam or compressed-air inlet 10 is also formed in the casing 5, said steam-inlet communicating with the annular steam-chamber 11, which surrounds the upper tube 12, which is attached to the casing 5 by means of screw-threads 14. The lower inner wall of said upper tube 12 is also cone-shaped, as shown at 15, the gas passing between the inner walls of the upper tube 12 and the outer wall of the air-tube 1. A series of steam-ports 16, which are arranged at an angle, extend from the steam-chamber 11 through the lower end of the upper tube 12 and communicate with the circular burner 9 or space formed between the ports.

The operation of my improved device is as follows: Gas entering the inlet, extending around in the gas-chamber 6, will be directed upwardly, as shown by the arrows in Figs. 1 and 2 of the drawings, and the combustion will take place at the upper end of the burner 9. The gas will then form a circular flame, which will be directed spirally by means of the spiral 2 and by reason of the central draft through the air-tubes 1 and 12. In case the gas-pressure is low and it is desired to increase the velocity of the gas in the burner, steam is permitted to flow through the inlet 10 and steam-chamber 11 and thence through the opening 16 into the burner, thereby greatly increasing the gas-pressure at the point of combustion and providing means whereby the gas may be more economically used.

The many advantages obtained by the use of my improved gas-burner will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

1. In a gas-burner, the combination of a sectional air-tube having a burner-opening between the sections thereof, a casing securing said sectional air-tube together having steam and gas inlets therein, communicating with one another at a point forward of where they communicate with the burner-opening, and a spiral arranged within said air-tube, substantially as described.

2. A device of the character described, comprising a sectional air-tube provided with a burner-opening, a casing securing the sections of said tube together, provided with air and gas inlets in communication with one another at a point in advance of where the burner-opening communicates with the interior of the air-tube, and a spiral within said air-tube extending above and below the burner-opening, substantially as described.

3. In a gas-burner, the combination of an air-tube, comprising two sections, having an annular burner-opening formed between the same, a casing connecting said sections, and a spiral arranged in said air-tube and extending above and below said burner-opening, substantially as described.

4. A device of the type set forth, comprising a central air-tube having a burner-opening therein, a casing surrounding the air-tube provided with steam and gas inlets, communicating with one another and with the burner-opening, and a spiral arranged within the central air-tube, substantially as described.

5. In a gas-burner, the combination of a central air-tube having a burner-opening formed therein, a casing surrounding said air-tube, and provided with gas and steam inlets, said gas and steam inlets communicating with each other in advance of the point where said burner-opening communicates with the interior of the said burner, and a spiral arranged within the said air-tube, substantially as described.

In testimony whereof I affix my signature in the presence of two witnesses.

EMMER F. GWYNN.

Witnesses:
JOHN NOLAND,
H. C. EVERT.